Nov. 1, 1955   W. E. HARDEMAN ET AL   2,722,389
AIRCRAFT LANDING SKIDS
Filed Oct. 15, 1952                                    4 Sheets-Sheet 1
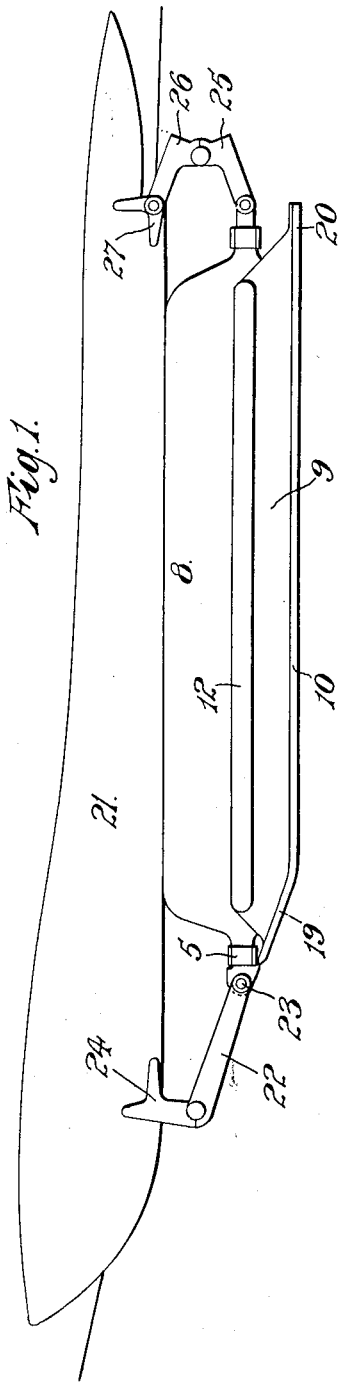
Inventors:
William Edward Hardeman
Henry Raymond Fletcher
Harold Wilson
Horace Victor Barlow
by Benj. T. Pauber
their attorney

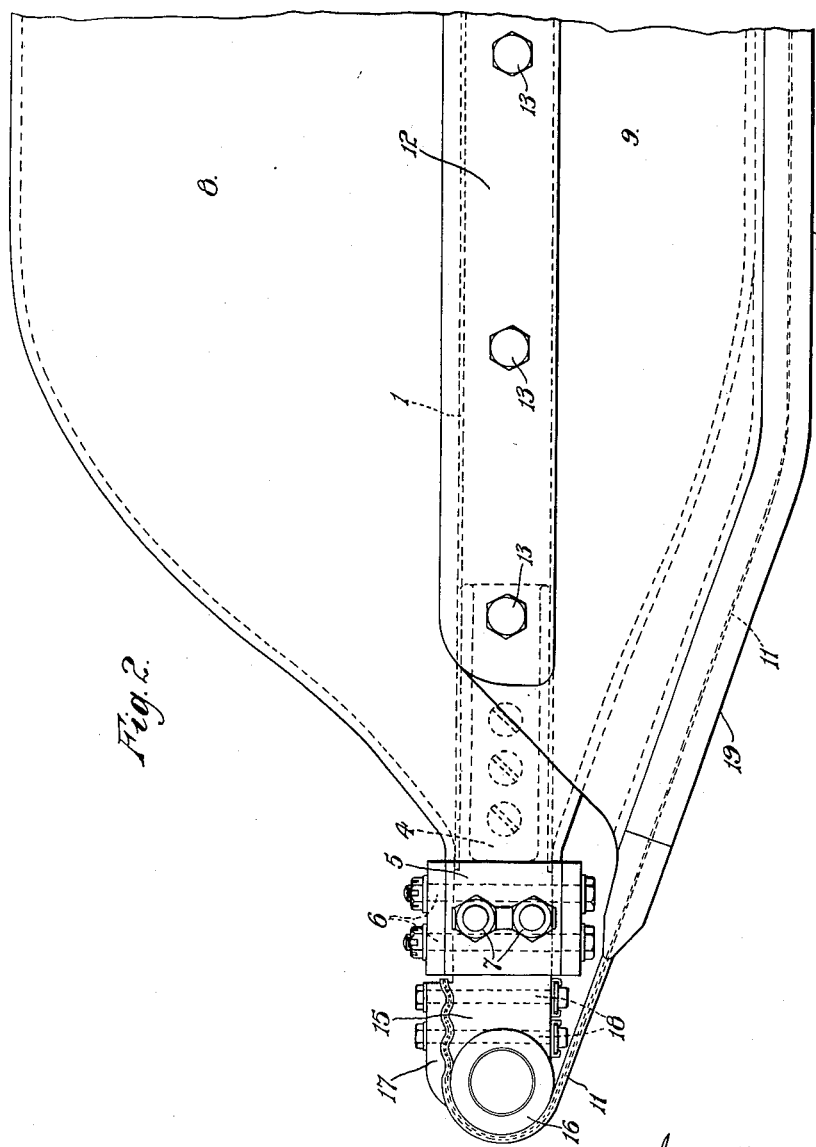

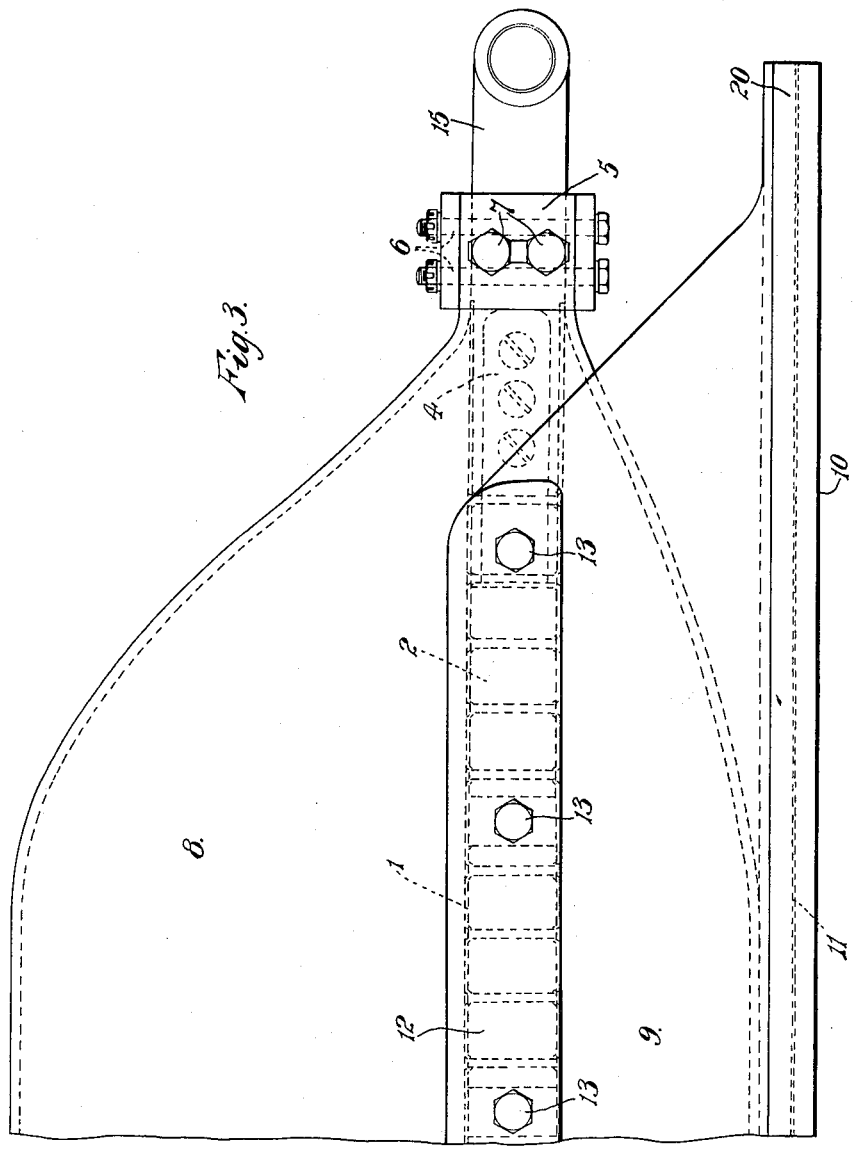

Nov. 1, 1955 W. E. HARDEMAN ET AL 2,722,389
AIRCRAFT LANDING SKIDS
Filed Oct. 15, 1952 4 Sheets-Sheet 4
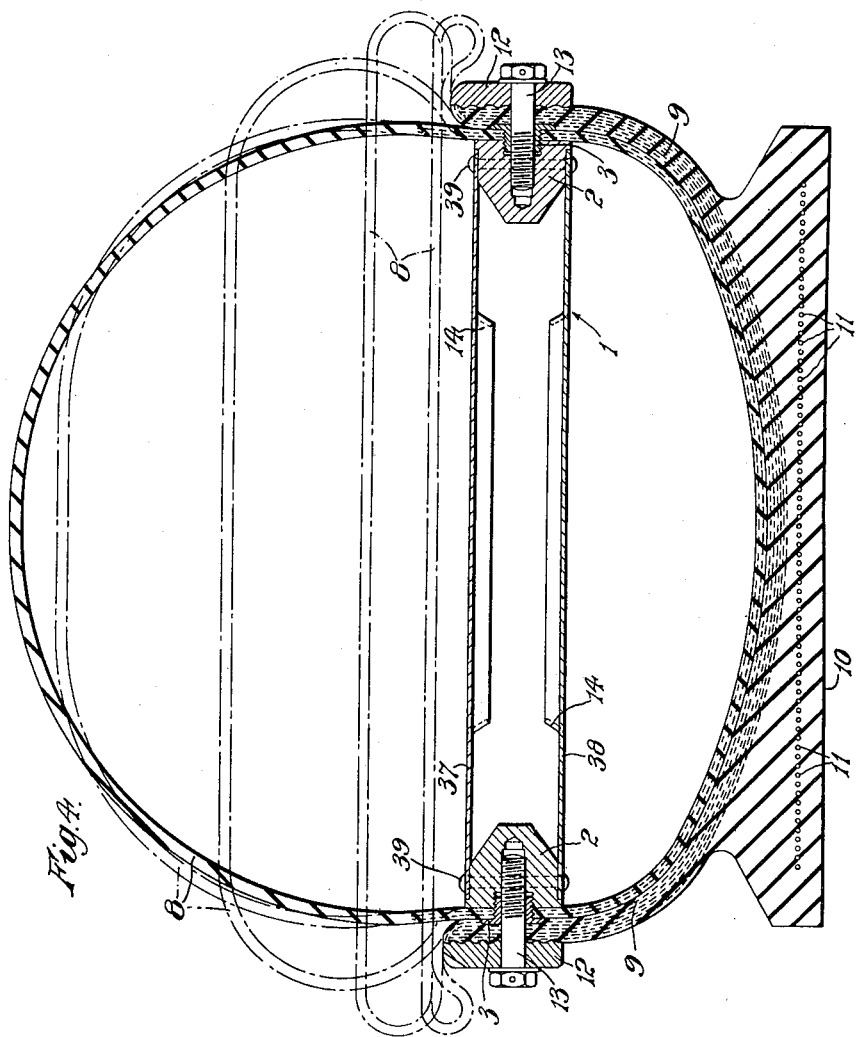

United States Patent Office 2,722,389
Patented Nov. 1, 1955

2,722,389

AIRCRAFT LANDING SKIDS

William Edward Hardeman, Solihull, Henry Raymond Fletcher, Ward End, Birmingham, Harold Wilson, Erdington, Birmingham, and Horace Victor Barlow, Marston Green, Birmingham, England, assignors to Dunlop Rubber Company Limited, London, England, a British Company, and Handley Page Limited, London, England, a British company Application October 15, 1952, Serial No. 314,776

Claims priority, application Great Britain November 16, 1951

6 Claims. (Cl. 244—100)

This invention relates to landing skids for aircraft.

Land based aircraft and naval aircraft are normally provided with a wheeled undercarriage landing apparatus. Such apparatus, and the mechanism to retract it into the fuselage of the aircraft, is both cumbersome and heavy and restricts the pay load which could otherwise be carried by the aircraft.

It is an object of the present invention to provide a shock-absorbing landing skid which will replace the conventional wheeled landing apparatus at present in use by aircraft.

It is a further object of the invention to provide a shock-absorbing landing skid having means to prevent or restrict lateral deformation of the skid during landing of the aircraft.

According to the invention an aircraft landing skid comprises a fluid-tight tubular flexible container secured to an aircraft having a substantially flat tread of friction material to contact the ground upon landing of the aircraft and a means for restricting lateral displacement of the container when loaded and for maintaining said tread portion substantially flat.

In the preferred construction the fluid-tight tubular flexible container comprises an airbag provided with a rigid frame which is pivotally secured to the fuselage of the aircraft by linkages. The airbag is made of canvas-reinforced rubber and is filled with compressed air, the pressure of which is considerably less than that within the inner tube of a tyre fitted to a comparable aircraft, since the weight of the landing aircraft is carried by the entire length of the airbag and not, as in the case of a wheel, by about one sixth of its periphery. For the same reason the airbag may be lighter and less robust in construction than the casing of a tyre, since it is not subject to the same severe stresses as a loaded and rotating tyre casing. The part adjacent the ground is provided with a moulded friction facing having a tread adapted to contact the ground and the part remote from the tread is located adjacent the fuselage of the aircraft and as the aircraft lands the airbag is forced against the fuselage to cushion the shock.

In order that the invention may be more fully described, reference is made to the accompanying drawings, of which:

Figure 1 represents a side elevation of an aircraft landing skid according to one embodiment of the invention, Figure 2 is a side elevation of the front end of the skid showing the forward clamping and link attachment, Figure 3 is a side elevation of the rear end of the skid showing the rearward clamping and link attachment, Figure 4 is a cross-section through the skid at a point mid-way along its length, In one embodiment of the invention (Figs. 1, 2, 3 and 4) a landing skid for an aircraft comprises an open ended cylinder of rubberised canvas, within which is located a rectangular box-type frame 1 lying in a plane parallel to a median plane thereof and at a height of about one third of its diameter. The frame comprises two longitudinally-extending side members 2 of substantially rectangular section, the ends of which are bolted to two transverse U-shaped end members 4. Two thin rectangular metal plates 37 and 38 of substantially the same length and breadth as the frame are secured to the top and bottom of the frame by rivets 39 which pass through the side members as shown in Figure 4. The two side members 2 are fluid-tightly secured to the wall of the cylinder by a plurality of hollow bolts 3 thus dividing the cylinder into two compartments. The open ends of the cylinder are drawn against the two transverse end members 4 of the frame and are secured thereto in a fluid-tight manner by box-like straps 5 abutting said ends and held there by vertical and transverse bolts 6 and 7 respectively which extend through the ends into the frame. A fluid-tight flexible container is thus provided which will be described hereinafter as an airbag 8.

A moulded cover 9 of strong rubberised canvas is provided with a flat tread 10 of friction material, e. g. resin-bonded asbestos, which is reinforced with longitudinally-extending steel wires 11 as shown in Figure 4. The cover 9 is fitted over the smaller section of the airbag defined by the frame 1, the edges of the cover being substantially in line with the frame. A clamping strip 12 is fitted to each longitudinal edge of the cover and said strips and cover are secured rigidly to the side members 2 of the frame by bolts 13 which extend through the hollow bolts 3 and are screwed into the frame side members.

The top and bottom plates 37 and 38 respectively of the frame are provided with a number of large diameter equispaced holes 14 (Figure 4), the centres of which lie on the longitudinal axis of each plate. These holes allow free passage of air between the two chambers formed within the airbag 8. Each end member 4 of the frame is provided with an extension 15 parallel to its respective end of the frame and positioned exterior of the airbag. The steel reinforcing wires 11 at the front end of the tread 10 of friction material protrude from the tread and are wound round a boss portion 16 of the front extension and firmly secured to the top of the extension by a strap 17 and bolts 18. The strap 17 has a corrugated undersurface which corresponds to a similar surface formed on the top of the extension. The steel wires 11 pass between the underside of the strap 17 and the corrugations of the extension and are deformed thereby when the strap is tightened onto the extension by the bolts 18. The friction material at the front end of the skid is inclined slightly upwards at an angle to the plane of the tread as shown at 19 in Figure 2. At the rear end of the skid the wires 11 finish flush with the tread which is horizontal as shown at 20 in Figure 3.

The front end of the skid is secured to the fuselage 21 of the aircraft by a pair of links 22, each having one end pivotally secured to one end of the front transverse extension by means of a pin 23 passing through the boss 16. The links 22 are pivotally secured at their other end to one end of a downwardly-extending strut 24 which is rigidly attached to the fuselage. The rear end of the skid is secured to the fuselage 21 by two pairs of scissors links, i. e. each lower link 25 having one end pivotally connected to one end of the rear transverse extension and the other end pivotally connected to an upper link 26 which in turn is pivotally connected to a member 27 solid with the fuselage. When secured to the aircraft, the side of the airbag 8 remote from the tread 10 abuts the fuselage 21 of the aircraft, the system of linkages allowing the airbag to deflect when loaded. The airbag is inflated through a valve (not illustrated) extending therethrough into the body of the aircraft. The pressure in the unloaded airbag is relatively small, e. g. of the order of 7–8 lbs. per sq. inch.

The aircraft is launched by means of a catapult or launching trolley, and on landing the skids deflect under the full landing load. The airbag may deflect to the limit permitted by the frame, the linkage permitting such deflection to take place. The pressure in the airbag may then rise to as much as three times the unloaded pressure. The tread 10 of the skid is made of friction material which does not readily char or conduct heat, therefore the airbag is not seriously affected by the heat generated by the frictional engagement on landing. The frame 1 holds the bottom part of the airbag and the cover 9 rigid and prevents the skid from rolling. The tread, cover and airbag are all firmly anchored to the frame, which in turn is securely fastened to the aircraft. There is thus little possibility of the tread and cover stripping from the bag, or the whole skid being stripped off the aircraft when the aircraft lands.

Having described our invention—what we claim is:

1. An aircraft landing skid comprising a fluid-tight tubular, flexible container, the bottom wall of said container comprising a substantially flat tread of friction material to contact the ground upon landing of the aircraft and a rigid, longitudinally extending open rectangular frame within the container secured to the side walls thereof and spaced from the top and bottom walls thereof and having extensions at the front and rear projecting from the container to be pivotally connected to an aircraft to restrict lateral displacement of the container and to maintain said tread substantially flat.

2. The skid of claim 1 having a plate spanning said rectangular frame.

3. An aircraft landing skid comprising a tubular, flexible, fluid-tight container, a rigid open rectangular frame secured to and within said tubular flexible fluid-tight container and having extensions projecting from the ends thereof to be pivotally secured to said aircraft.

4. A skid according to claim 1 in which said tread comprises a moulded cover carrying the tread enclosing the lower portion of the container and having an upwardly extending portion rigidly secured to the front extension of said frame.

5. A skid according to claim 4 wherein the tread contains longitudinally extending reinforcing wires which project from the tread and are secured to the front extension.

6. A skid according to claim 1 wherein the container is of cylindrical form and cross members gripping the front ends of the container to the frame.

References Cited in the file of this patent

UNITED STATES PATENTS

| 1,177,263 | Ollivier | Mar. 28, 1916 |
| 1,317,741 | Turnbull | Oct. 7, 1919 |
| 2,349,584 | Arnstein | May 23, 1944 |
| 2,391,326 | McKinley | Dec. 18, 1945 |
| 2,429,992 | Crispell | Nov. 4, 1947 |
| 2,533,951 | Patriarche | Dec. 12, 1950 |

FOREIGN PATENTS

| 126,934 | Great Britain | May 14, 1918 |
| 604,223 | Great Britain | June 30, 1948 |